United States Patent [19]

Shimomura et al.

[11] Patent Number: 5,613,047
[45] Date of Patent: Mar. 18, 1997

[54] APPARATUS HAVING SELF-REPAIRING FUNCTION AND METHOD OF SELF REPAIRING THE SAME

[75] Inventors: Yoshiki Shimomura; Sadao Tanigawa; Yukihiro Mori, all of Osaka; Yasushi Umeda, Tama; Tetsuo Tomiyama; Hiroyuki Yoshikawa, both of Tokyo, all of Japan

[73] Assignee: Mata Industrial, Co., Ltd., Osaka, Japan

[21] Appl. No.: 344,812

[22] Filed: Oct. 11, 1994

[30]  Foreign Application Priority Data

Oct. 8, 1993  [JP]  Japan .................................. 5-253487

[51] Int. Cl.$^6$ .................................................. G06K 15/00
[52] U.S. Cl. .................................. 395/113; 399/9; 399/31
[58] Field of Search ......................................... 395/113, 112; 355/202, 203, 204, 205, 208, 243, 323, 207; 340/825.6, 825.16

[56]  References Cited

U.S. PATENT DOCUMENTS

| | | | |
|---|---|---|---|
| 4,609,283 | 9/1986 | Murata et al. | 355/208 |
| 5,317,368 | 5/1994 | Shimomura | 355/207 |
| 5,396,314 | 3/1995 | Umeda | 355/207 |
| 5,485,246 | 1/1996 | Hayashi et al. | 355/202 |

FOREIGN PATENT DOCUMENTS

| | | |
|---|---|---|
| 562588 | 9/1993 | European Pat. Off. . |
| 564711 | 10/1993 | European Pat. Off. . |
| 5165275 | 2/1993 | Japan . |

*Primary Examiner*—Arthur G. Evans
*Attorney, Agent, or Firm*—Beveridge, DeGrande, Weilacher & Young, LLP

[57]  ABSTRACT

According to the present invention, a concept of functional quantities indicative of quantified functional degrees of such lower-level functions as "clearer characters", "cleaner background", and "thicker characters", which are subordinating to a qualification-oriented function of "more beautiful characters". Characteristic patterns of functional quantities F1, F2 and F3 of the lower-level functions for physical parameters (for example, the surface potential of a photoreceptor body) are prepared. When a fault repair is implemented by changing a value of a physical parameter, a tradeoff occurs between lower-level functions which are influenced by the physical parameter. That is, taking into account the functional quantities F1, F2 and F3 of the lower-level functions, the value of the physical parameter is set so that the functional quantity of the function of "more beautiful characters" is maximized. By introducing the concept of the functional quantities indicative of the quantified functional degrees of the functions, a flexible self-repairing function can be realized, thereby optimizing a repair operation.

16 Claims, 13 Drawing Sheets

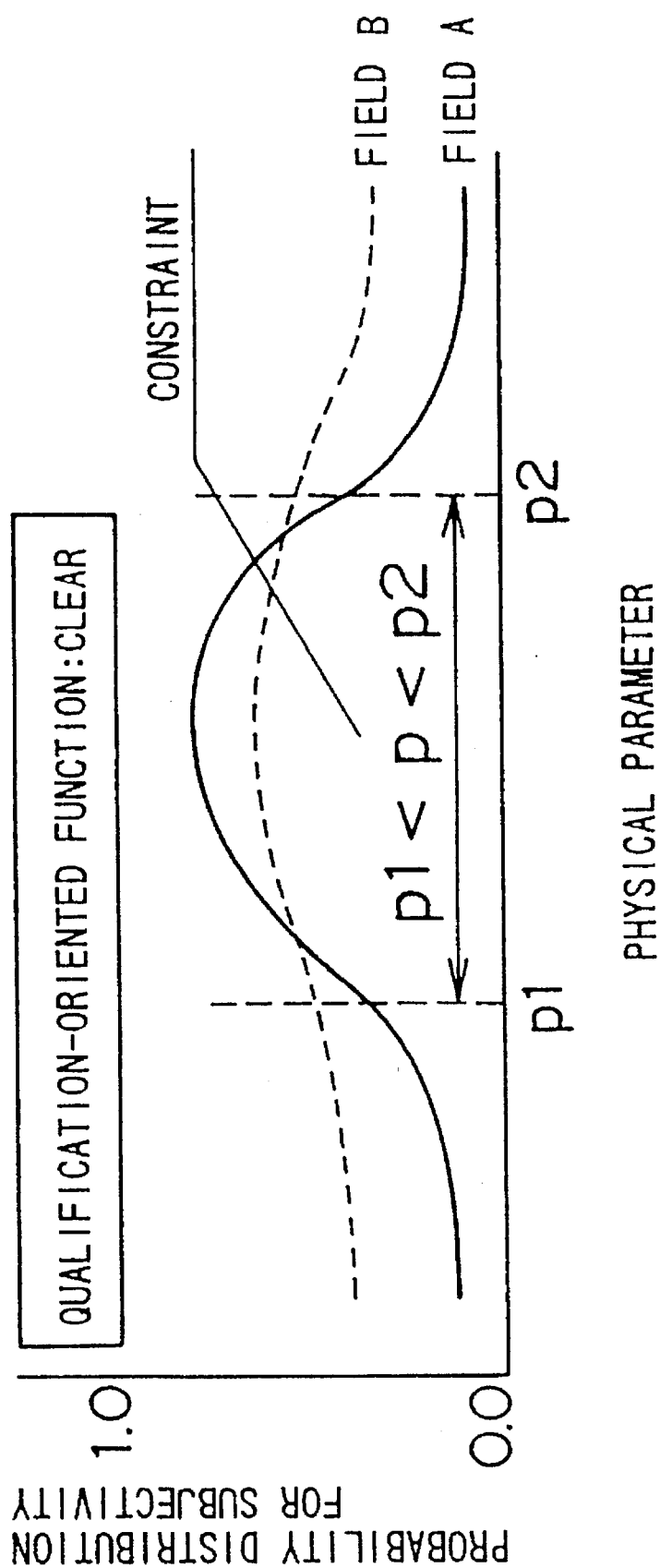

F I G. 3

MORE BEAUTIFUL CHARACTER IMAGE
- CLEARER CHARACTERS
- THICKER CHARACTERS
- CLEANER BACKGROUND

QUALIFICATION-ORIENTED FUNCTION:CLEARER CHARACTERS

—— TECHNICAL STAFF
(MEAN FUNCTIONAL QUANTITY:0.458)
------ CLERICAL SERVICE
(MEAN FUNCTIONAL QUANTITY:0.233)

QUALIFICATION-ORIENTED FUNCTION:CLEANER BACKGROUND

—— TECHNICAL STAFF
(MEAN FUNCTIONAL QUANTITY:0.092)
------ CLERICAL SERVICE
(MEAN FUNCTIONAL QUANTITY:0.056)

F I G. 5

MORE BEAUTIFUL CHARACTER IMAGE
- 0.639 — CLEARER CHARACTERS
- 0.236 — THICKER CHARACTERS
- 0.125 — CLEANER BACKGROUND

FIG. 9

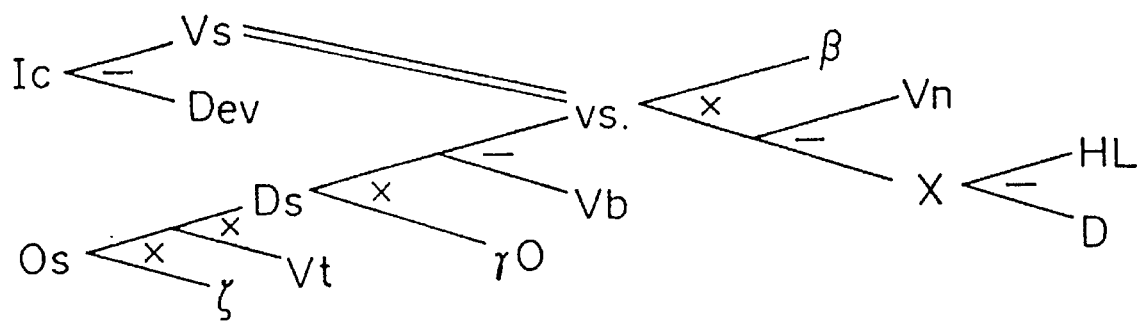

Os : DENSITY OF OUTPUT IMAGE
$\zeta$ : SENSITIVITY OF COPY SHEET
Vt : OUTPUT OF TRANSFER CHARGER
Ds : TONER DENSITY ON DRUM
$r0$ : TONER SENSITIVITY
Vs : SURFACE POTENTIAL OF DRUM AFTER EXPOSURE TO LIGHT
Ic : IMAGE CONTRAST
Vb : OUTPUT OF BIAS VOLTAGE FOR DEVELOPMENT
$\beta$ : DRUM SENSITIVITY
Vn : OUTPUT OF MAIN CHARGER
X : LIGHT QUANTITY OF HALOGEN LAMP ON OPTICAL PATH
HL : OUTPUT OF HALOGEN LAMP
D : DENSITY OF DOCUMENT ORIGINAL
Dev : SENSITIVITY OF DEVELOPER AGENT F I G. 10A
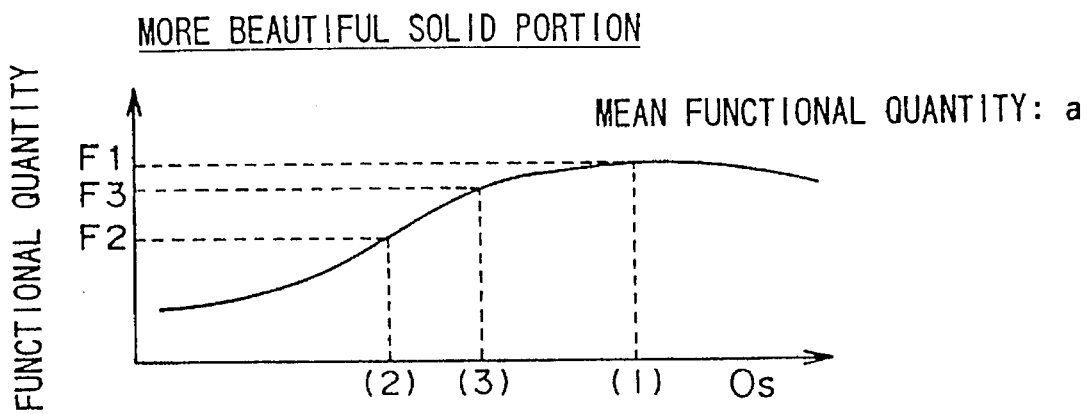
(1) NORMAL STATE
(2) FAULTY STATE
(3) REPAIRED STATE
F I G. 10B
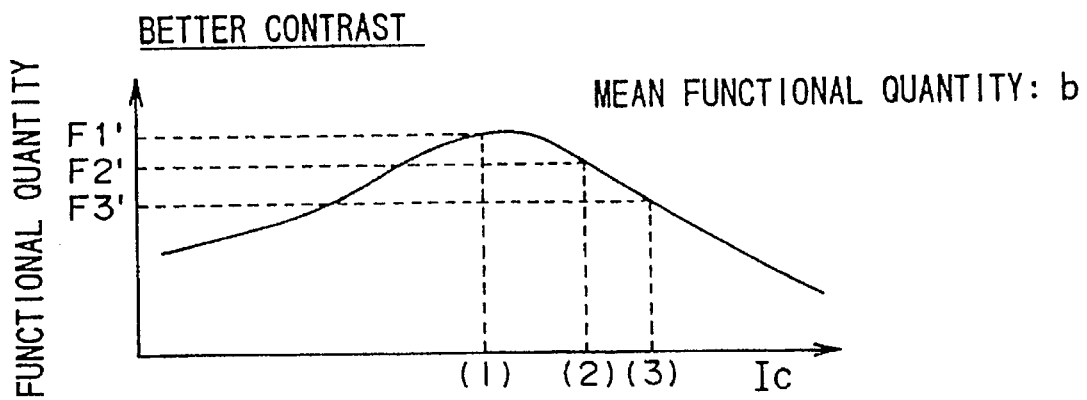
(1) NORMAL STATE
(2) FAULTY STATE
(3) REPAIRED STATE HALOGEN LAMP IS ALTERNATIVELY USED
TO RECOVER CHARGE ERASE FUNCTION
FIG. 11(a) MORE BEAUTIFUL IMAGE
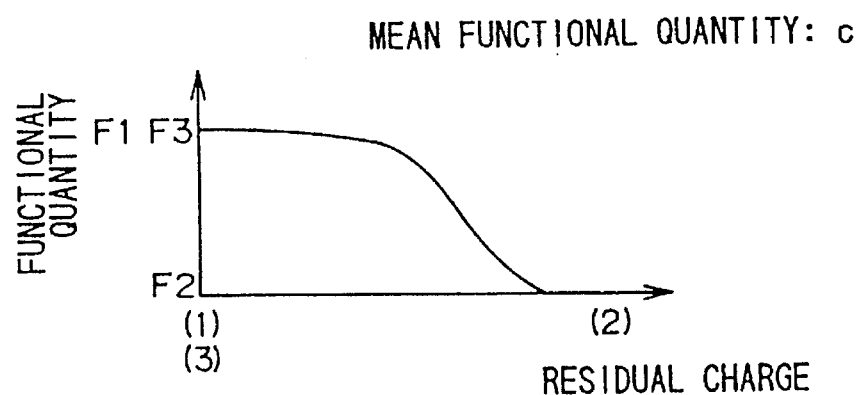
FIG. 11(b) LOWER COPYING COST
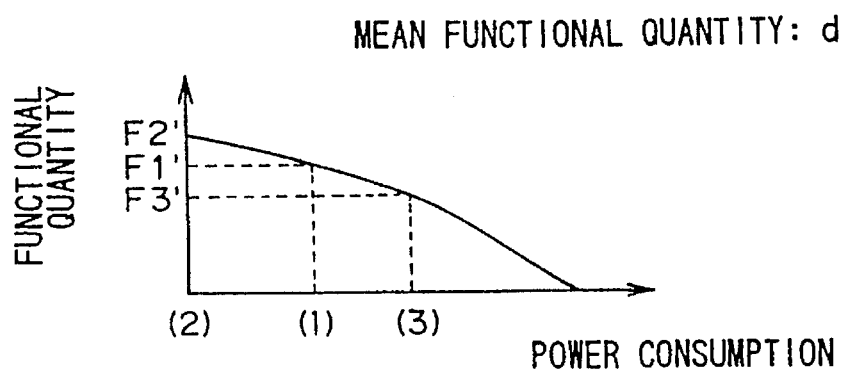
$$Frepair1 = cF3 + dF3'$$

SEPARATOR CHARGER IS ALTERNATIVELY USED
TO RECOVER CHARGE ERASE FUNCTION
FIG. 12(a) MORE BEAUTIFUL IMAGE
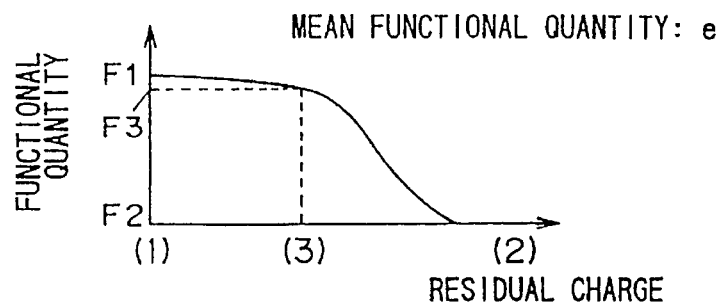
FIG. 12(b) FASTER COPYING SPEED
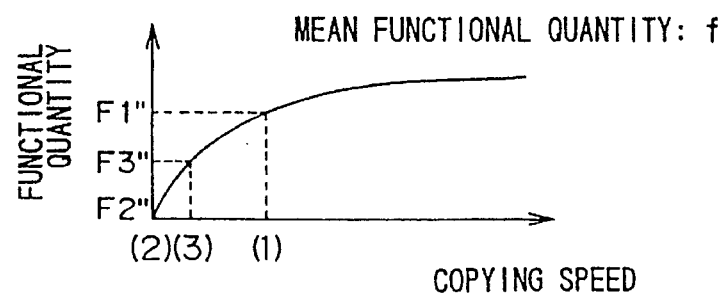
FIG. 12(c) DESIRED COPY SIZE
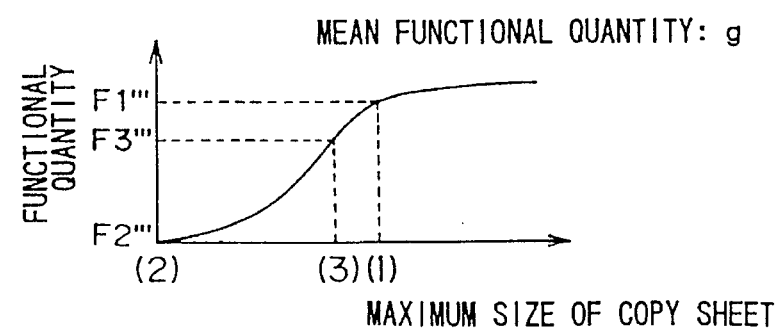
$$F_{repair2} = eF3 + fF3'' + gF3'''$$

APPARATUS HAVING SELF-REPAIRING FUNCTION AND METHOD OF SELF REPAIRING THE SAME

BACKGROUND OF THE INVENTION

1. Field of the Invention

The present invention relates to an apparatus having a self-repairing function which implements a self-repair of a fault which prevents the apparatus from satisfactorily performing a given function, and a method of self-repairing the apparatus.

2. Related Art

It has been proposed in the field of image forming apparatus such as copying machines to additionally provide a so-called self-repairing function. The self-repairing function is intended to make diagnoses and repairs on functions relative to image forming for maintenance. Typical apparatus having such self-repairing function is disclosed in Japanese Unexamined Patent Publication No. 2-252121 (1990).

In the apparatus disclosed in this publication, a function to be maintained is monitored by checking whether the function is active or not, and the repair of the function is achieved by actuating another function which can substitute for the function to be maintained.

That is, the conventional self-repairing function employs so-called "two-choices" diagnosing and repairing approaches and, therefore, does not take into consideration degrees of functional degradation and functional recovery. This may be attributed to the difficulty in quantifying the abstract concept of functions.

Accordingly, the conventional self-repairing function makes an extreme choice in a certain sense, which includes such choices that other functions are abandoned for the maintenance of a particular function A, and that a method of repairing (a) for a particular function A is not employed because the method may influence the other functions.

SUMMARY OF THE INVENTION

In view of the foregoing difficulty, it is an object of the present invention to provide an apparatus having a self-repairing function which implements a flexible repair by introducing a concept of a functional quantity indicative of a quantified functional degree.

It is another object of the present invention to provide an improved method of self-repairing an apparatus which implements a flexible repair by introducing a concept of a functional quantity indicative of a quantified functional degree.

According to one aspect of the present invention, an apparatus having a self-repairing function implements a self-repair in consideration of the recovery degree of a faulty function and the degradation degree of the other normal functions influenced by a secondary effect of the self-repair. For this purpose, functional quantity data are preliminarily investigated and stored in a memory. A given function actuated by the apparatus is decomposed into a plurality of more specific lower-level functions. The functional quantity data include characteristic data of a functional quantity indicative of a relationship of each of the plural lower-level functions subordinating to the given function and a change in a physical parameter corresponding to said each lower-level function.

When a fault occurs, a physical parameter which should be changed to repair the fault and a secondary effect which is to be produced by a change in the physical parameter are indicated. Characteristic data of a functional quantity corresponding to the indicated physical parameter and changeable characteristic data of a functional quantity influenced by the secondary effect are read out of the memory, and the most preferably balanced state of the read-out functional quantities are determined through calculation. Then, a self-repair is implemented by changing a value of the indicated physical parameter to realize the most preferably balanced state.

According to another aspect of the present invention, functional quantity data include characteristic data of a functional quantity relative to an effect which is to be produced when an occurring fault is repaired, and characteristic data of a functional quantity relative to a risk which is to be caused when the occurring fault is repaired. A flexible self repair can be carried out by balancing the manifestation degrees of the functional quantities relative to the effect and the risk.

According to still another aspect of the present invention, functional quantity data include characteristic data assigned to a particular function important for the apparatus in which a functional quantity thereof is set to be extremely lowered by a change in a physical parameter. Therefore, if the functional quantity is extremely lowered by a fault, the fault can be immediately self-repaired. On the other hand, if the functional quantity is not extremely lowered by a fault, the timing of implementing a self-repair can be flexibly adjusted.

In accordance with another aspect of the present invention, a concept of functional quantities indicative of quantified functional degrees of lower-level functions subordinating to a given function is introduced to realize a self-repairing function. Characteristic patterns of functional quantities of the lower-level functions for a change in a given physical parameter are prepared, which are utilized to determine an optimized physical parameter value to be set when a fault occurs. When the fault actually occurs, there is proposed a self-repair of the fault to be implemented by changing a value of the physical parameter which influences the lower-level functions relative to the fault. At this time, functional quantities of the lower-level functions influenced by a change in the physical parameter are read out of the memory means, and then a functional quantity of the given function is calculated based on characteristic patterns of the read-out functional quantities. Finally, a value of the physical parameter is set based on the calculated functional quantity of the given function so as to ensure the maximum performance of the given function.

Accordingly, when a plurality of lower-level functions are influenced by a change in the physical parameter, a tradeoff is made among the plural lower-level functions to set a value of the physical parameter. As a result, a flexible repair of a fault can be realized, unlike the conventional repairing method in which an extreme choice is made such as whether a repair is made or not.

In accordance with another aspect of the present invention, characteristic patterns of functional quantities indicative of quantified functional degrees of functions are prepared, which functions each correspond to an effect and a risk which may occur when a given repairing method is employed for a repair of a fault. When a plurality of repairing methods are proposed, a functional quantity of a given function is calculated for each of the plural repairing methods, based on the functional quantities each corresponding to the effect and risk of each repairing method. Finally, the most preferable repairing method which ensures the maximum performance of the given function is reliably selected based on the calculated functional quantity of the given function.

In accordance with another aspect of the present invention, characteristic patterns of functional quantities indicative of quantified functional degrees of functions relative to a given fault are prepared. When the fault actually occurs, a degree of the fault is quantified by calculating a functional quantity of a given function based on functional quantities relative to the fault. Finally, a timing of implementing a self-repairing function is variably set based on the quantified fault degree.

Accordingly, a flexible repair can be realized in such a way that a critical fault is immediately self-repaired by the self-repairing function and a trivial fault is repaired when the apparatus is not in use, since the timing of implementing the self-repairing function is variably set depending on the degree of a fault.

BRIEF DESCRIPTION OF THE DRAWINGS

FIG. 2 is a diagram illustrating a probability distribution for the subjectivity versus the physical parameter.

FIG. 3 is a diagram illustrating an example of lower-level functions subordinating to a function.

FIG. 5 is a diagram illustrating weights of lower-level functions to a function.

FIG. 9 is a diagram illustrating a parameter model for judging secondary effects.

FIG. 10A and 10B are diagrams illustrating an example of characteristic patterns of functional quantities.

FIGS. 11A and 11B are diagrams illustrating an example of characteristic patterns of functional quantities which are taken into account when a halogen lamp is alternatively used to recover a charge erase function.

FIGS. 12A, 12B, and 12C are diagrams illustrating an example of characteristic patterns of functional quantities which are taken into account when a separator charger is alternatively used to recover a charge erase function.

DESCRIPTION OF THE PREFERRED EMBODIMENTS

There is now described a concept of the quantification of functions which is the premise of the present invention, and thereafter the self-repairing function according to one embodiment of the present invention.

1. Quantification of Functions

1—1. Introduction of Concept of Functional Quantities

One of the major subjects for the realization of computer-supported concept designing is the expression and definition of functions for the purpose of designing a concept. The present invention proposes a concept of "functional quantities" indicative of functional degrees quantified on the basis of an assumption that functions can be quantified and expressed as degrees of satisfying objectives of the functions through an approximate quantification.

The criterion of a functional evaluation by humans are very vague. However, when a machine is designed, for example, attribute values are defined for necessary functions of the objective machine so as to satisfy certain criterion of the functions. The defined values appear in an objective description as physical constraints.

On the other hand, in a research field of design or maintenance, it is a very important subject how to handle functions per se, and there have been various discussions about the expression and definition of functions. For example, see Tetsuo Tomiyama, and Hiroyuki Yoshikawa, "Aiming at Construction of Functional Theory—From the Viewpoint of Configuration", Journal of Precision Engineering Society, Vol. 56, No. 6, pp. 6–10 (1991). From these discussions, a consensus of "a concept of functions is established on human recognition"have been obtained. However, there has been few discussions about the recognition of functions and the mechanism of abstraction of functions. One reason is that it is unavoidable to introduce subjective matters such as human disposition and emotion in order to handle the recognition and abstraction of functions. There exist some difficulties in linking those subjective matters with engineering.

1-2. Methodology of Expression of Functions

Figure 1A:
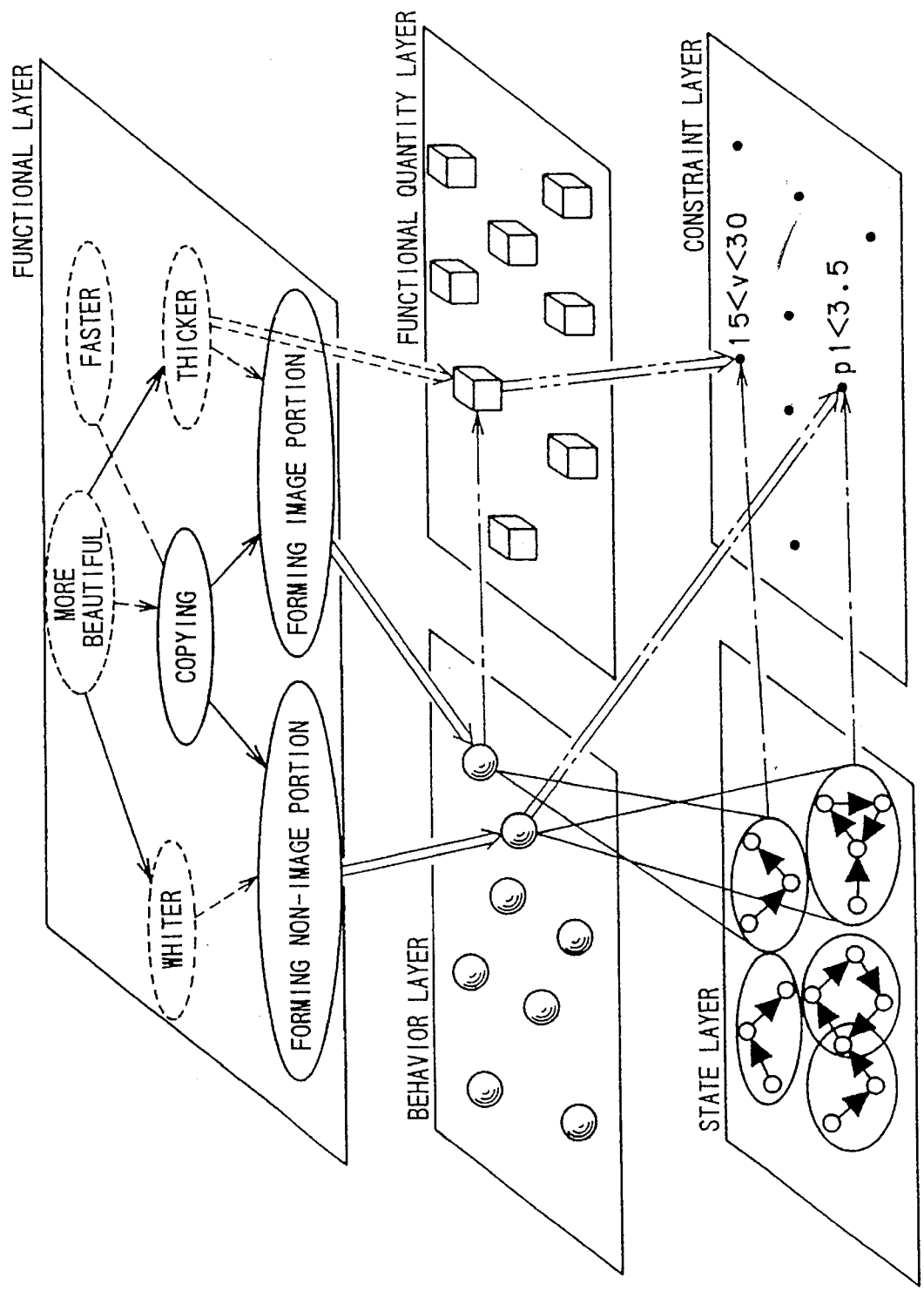
FIG. 1A is a diagram illustrating a model showing the relationship among functions, behaviors, states and constraints.
Figure 1B:
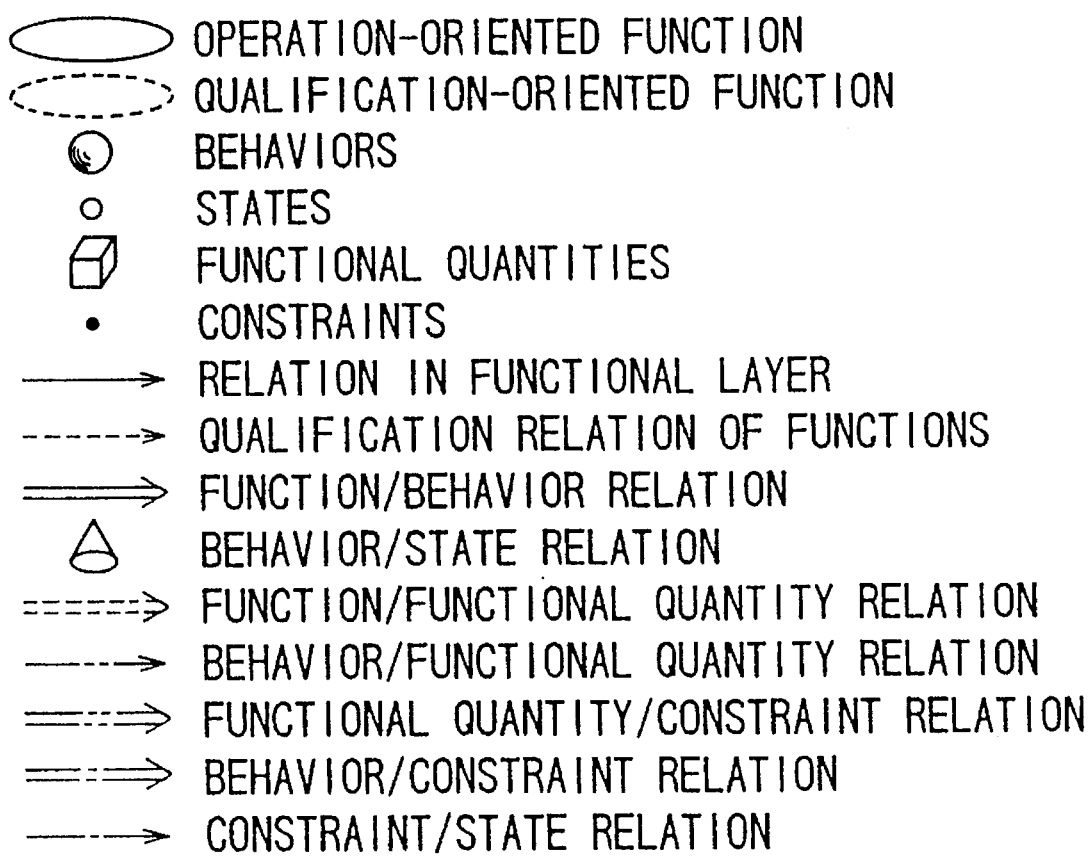
FIG. 1B is a diagram explaining signs and symbols in words in FIG. 1A to complement FIG. 1A.

A function can be considered to be an abstract expression of the behavior of an object recognized by a human. The behavior of the object can be objectively described as a transition of physical states of the object. FIGS. 1A and 1B show a functional model illustrating the relationship among the functions, behaviors, states and constraints. This model employs an example of a copying machine. The term "state" means a state of the machine which is defined by internal states and external states such as an environment. The concept of the internal states includes parts, attributes of the parts, connections between the parts, relations between the attributes of the parts, and the structure of the machine. The term "behavior" is defined as a change in one or more states (including no change). The term "function" is defined as a description of a behavior which is recognized and abstracted for a certain purpose by a human. That is, a function is basically described in a form of "doing something".

In the model shown in FIGS. 1A and 1B, it is assumed that a function has two types of aspects: one is an operation-oriented aspect which readily corresponds to a behavior requirement of the machine (e.g., "making a copy" and "forming an image"); and the other is a qualification-oriented aspect which readily corresponds to a constraint (e.g., "beautiful" and "thick"). It is further assumed that an evaluation of the qualification-oriented aspect of a function by a human can be broken down into evaluations of physical constraints by limiting a domain in a functional field. Namely, it is assumed that a function has a conceptual meaning of constraints defined for humans, and the constraints serve as physical conditions for restricting the manifestation of a certain function. In this sense, the constraints and the physical conditions have an interdependent relationship.

If the subjectivity of the functional evaluation is taken into account to select parameters of the constraints of a function and to specify the criterial values thereof based on this assumption, and the constraints are allocated to the corresponding objective functions, the functional evaluation by humans can be modeled as an evaluation of the constraints. On the basis of this assumption, the functions can be quantified and expressed in a quantified amount. 1-2-1. Introduction of Sensibility Engineering In this embodiment, an approach of sensibility engineering is employed for the assignment of constraints to the corresponding objective functions. The sensibility engineering aims to quantitatively handle a subjective evaluation of an object by assigning objectively evaluable physical quantities to the subjective evaluation. More specifically, the subjective evaluation is quantified by the combination of psychological tests and statistics. In this embodiment, the probability concerning the subjectivity of a function (i.e., the probability of the manifestation of a subjective function) is defined as a ratio of the number of people who recognize the manifestation of the function to that of a population. By specifying how to sample the population, a "domain of field" is defined for a particular subjective function (see Hiroyuki Yoshikawa, "Reliability Engineering", published by Corona Publication (1979)). The domain of field means a particular area appearing in the field.

According to the aforesaid approach, the subjective evaluation is obtained in a form of a probability distribution of the subjective evaluation versus the physical parameter (see FIG. 2). If the degree of the manifestation of a function can be expressed in a scale of the probability, the balancing and tradeoff between different functions will become possible. The degree of the manifestation of a function corresponds to the aforesaid "functional quantity".

1-2-2. Functional Quantity and Information Quantity

The following assumptions are derived from fundamental properties to be possessed by a functional quantity:

Assumption 1

The functional quantity indicative of a degree of the manifestation of a function must be a quantity to be recognized by a human. However, the functional quantity will never be changed by the degree of the recognition and, therefore, it is considered that the change in the functional quantity is due to a change in the content of the manifesting function;

Assumption 2

As far as the probability concerning the functional quantity means the probability concerning subjectivity, it is considered that the functional quantity of a function increases with a higher output probability;

Assumption 3

The fact that a probability distribution concerning the subjectivity of a function has a peak indicates that there exists a certain consensus on the function. Therefore, it is considered that the expectation (which is referred to as a mean functional quantity) of the function is high; and Assumption 4

It is required to explain that a difference in the evaluation result of a function is due to a difference in the domain of a field employed for the evaluation.

Another abstract concept which is influenced by the subjectivity similarly to the function is "information". If it is possible to define an "information quantity" for information, it is also possible to define a functional quantity for a function in a similar manner.

Shannon has defined the information quantity (or the amount of information) as an entropy change caused by the acceptance of the information (see Hideki Imai, "Information Theory", published by Shokodo (1979)). An entropy H(S) of an information source S is obtained from the following equation:

$$H(S) = \sum_{i=1}^{m} p_i \log_2 p_i \qquad (1)$$

where $p_i$ means occurrence probabilities $p_1, p_2, \ldots,$ and $p_m$ of output units $a_1, a_2, \ldots,$ and $a_m$ from the information source. The entropy H(S) is also referred to as a mean information quantity $I_M$, and indicates a mean value of the information quantities which are obtained when one output from the information source S is detected. The information quantity I(p) of an output is obtained from the following equation:

$$I(p) = -\log_2 p \qquad (2)$$

That is, the information quantity is modeled by way of the probability of recognition, and varied depending on the degree of the recognition.

There are some differences between the functional quantity and thus defined information quantity. First of all, the probability concerning the functional quantity is a probability expressed in a form of the subjectivity versus the physical parameter and, therefore, is not changed by the degree of the recognition. It is considered on the basis of the aforesaid Assumption 2 that, while the information quantity I(p) serves as a scale of the probability of the unknowability of particular information, the functional quantity (assumed as F(p)) serves as a scale of the probability of the manifestation of the function. In the theory of information quantity, the means information quantity $I_M$ shows a minimum value when any one of the probabilities p1, p2, . . . , and $p_m$ is 1 and the others are 0, and shows a maximum value when p1=p2= . . . =1/m, or all the occurrence probabilities of the output units are the same. In the theory of functional quantity, however, a mean functional quantity $F_M$ must have an opposite pattern in accordance with the aforesaid Assumption 3.

Accordingly, with reference to the aforementioned equations concerning the information quantity, the functional quantity F(p) and the mean functional quantity $F_M$ are defined by way of the probability of a conceptual matter evaluated by a human, as follow:

$$F(p) = -\log_2(1-p) \qquad (3)$$

$$F_M = -\sum_{i=1}^{m} p_i \log_2(1-p_i) \qquad (4)$$

where p and $p_i$ are probability values concerning subjectivity.

Thus defined functional quantity is consistent with the aforesaid Assumption 4, i.e., a difference in evaluation result can be explained by a change in probability distribution concerning subjectivity due to a difference in the domain of a field (see FIG. 2).

2. Detailed Description of Functional Quantity

2-1. Calculation of Functional Quantity

The calculation of the functional quantity will be hereinafter described. The probability concerning subjectivity which is necessary to calculate the functional quantity is obtained through a psychological evaluation method called Semantic Differential (SD) Method (see Mitsuo Nagamachi, "Sensibility Engineering", published by Kaibundo (1988)). The SD method is an effective psychological test for the quantification of vague impression which has been acquired by a human. A psychological test by the SD method follows such a process as showing a plurality of different samples to subjects and then sampling impressions about the respective samples from the subjects.

An example case in which an electrostatic copying machine is used as an objective machine will be briefly explained. In the electrostatic copying machine, an electrostatic latent image corresponding to an original image is formed on the surface of a photoreceptor body by exposing the surface of the uniformly electrically-charged photoreceptor body to light. The electrostatic latent image is developed into a toner image, which is transferred and fixed onto a copy sheet. Thus, the image formation on the copy sheet is achieved. The density and contrast of the image are changed by changing the surface potential of the photoreceptor body.

Subjects are shown a plurality of images which have been formed, for example, with different value setting of the surface potentials of the photoreceptor body. Domains of a field, which are a premise of the functional evaluation, are defined by the kinds of images and subjects' occupations. Images employed for the functional evaluation include, for example, text images which are considered to be relatively important as image outputs. Subjects' occupations employed for the functional evaluation include, for example, technical staff and clerical service.

The evaluation of the outputs of text images is preferably conducted by evaluating a qualification-oriented function such as "more beautiful characters" which allows a comprehensive evaluation. However, the expression of this qualification-oriented function is too abstract to realize a direct quantification of the function. In this case, the qualification-oriented function "more beautiful characters" is subdivided into three lower-level functions such as "clearer characters", "thicker characters" and "cleaner background" through the SD method (see FIG. 3).

Physical constraints which influence the aforesaid qualification-oriented function are specified through the SD method, and then physical parameters capable of directly controlling the physical constraints are derived. When probabilities concerning subjectivity are converted into functional quantities, a probability density function concerning subjectivity is required. The probability density function concerning subjectivity can be obtained after a discrete probability distribution concerning subjectivity is smoothed into a continuous probability distribution.

2-2. Verification of Functional Quantity

If it is possible to translate the function into physical constraints by way of functional quantities, it is considered that the following conditions are valid:

Condition 1

A function with a high intuitive expectation must show a peak in a functional evaluation distribution and have a high means functional quantity. On the contrary, a function with a low intuitive expectation must have a flat distribution and a low mean functional quantity; and

Condition 2

The characteristic pattern of a functional quantity in a field must show a distribution which is consistent with our intuitive expectation.

On the other hand, if it is possible to evaluate the function by way of a functional quantity, the following condition is valid:

Condition 3

The maximum evaluation of a qualification-oriented function must be obtained by setting a physical parameter value which maximizes the functional quantity.

2-3. Translation of Qualification-Oriented Function to Physical Constraints

Figure 4A:
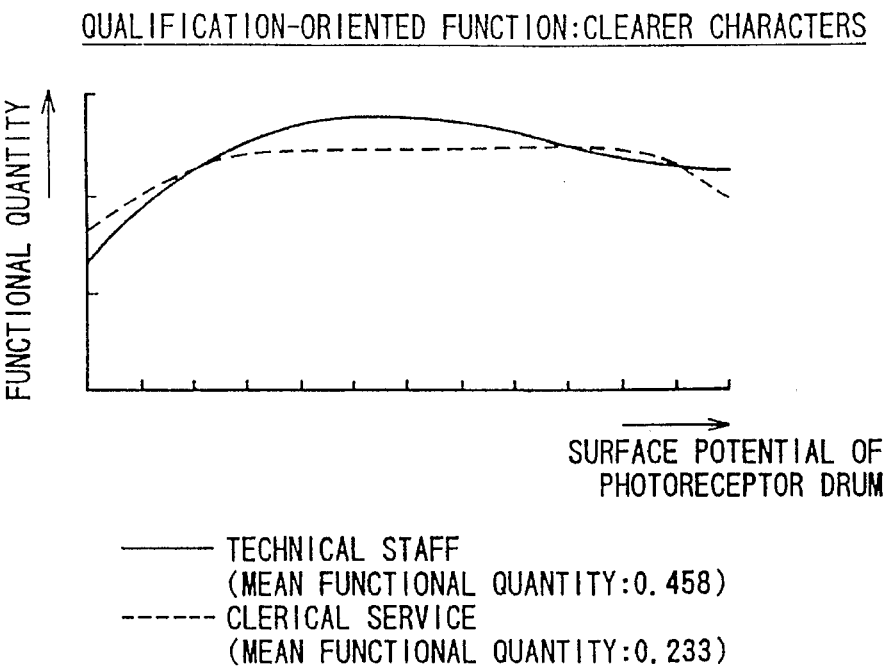
FIG. 4A and 4B are diagrams illustrating characteristic patterns concerning a qualification-oriented function.
Figure 4B:
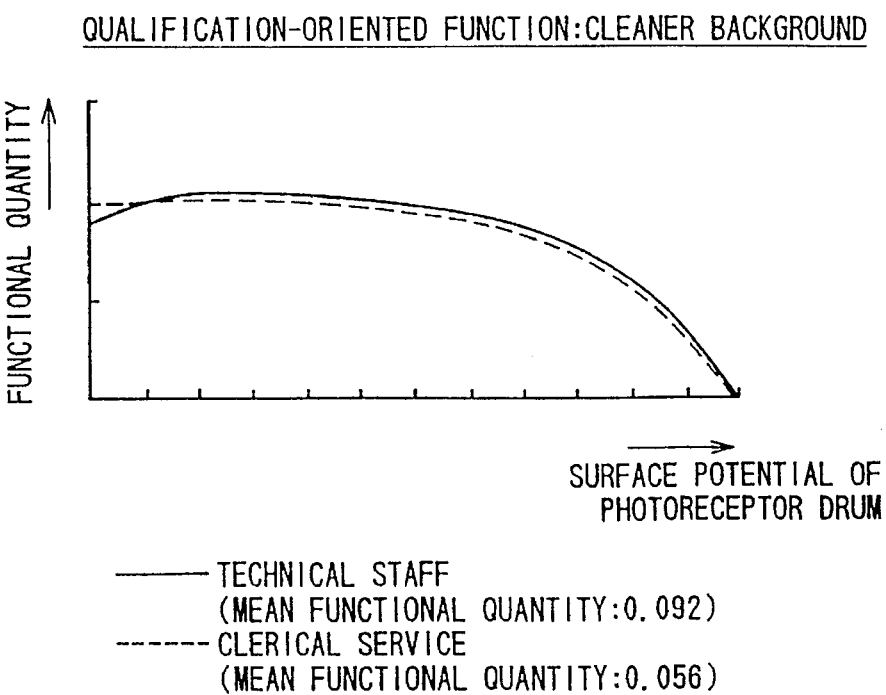

FIGS. 4A and 4B show a result of a functional evaluation which has been conducted on qualification-oriented functions "clearer characters" and "cleaner background" for two occupation groups, i.e., technical staff group and clerical service group. A physical parameter employed for this functional evaluation is the surface potential of the photoreceptor body.

As can be seen from FIGS. 4A and 4B, there exists an apparent difference in the mean functional quantity between these two functions, and the difference is remarkable especially in the technical staff group. In terms of the expectation degree of the function, it is considered that higher expectation is placed on the qualification-oriented function of "clearer characters" which reflects the performance of the machine than on the qualification-oriented function of "cleaner background" which is influenced by the kind of copy sheets in use, when a functional evaluation is actually conducted on a copying machine. That is, the result showing that the qualification-oriented function of "more beautiful characters" has a higher mean functional quantity than the qualification-oriented function of "cleaner background" is consistent with out intuitive expectation, and supports the aforesaid Condition 1.

Furthermore, FIG. 4A shows that the mean functional quantity of the qualification-oriented function of "clearer characters" is higher in the technical staff group than in the clerical service group. This is consistent with our intuitive expectation that the functional evaluation requires a uniform value judgement by the technical staff group. This supports the aforesaid Condition 2. Thus, it has been proved that the qualification-oriented function of "more beautiful characters" can be translated into a physical parameter by using a functional quantity.

2-4. Determination of Physical Parameter by Functional Quantity

If it is possible to determine a functional weight of each of the lower-layer functions shown in FIG. 3 to the qualification-oriented function of "more beautiful characters", a physical parameter value which maximizes the functional quantity of the qualification-oriented function of "more beautiful characters" can be obtained. There is now described how to determine the physical parameter value.

First of all, weights of the respective lower-level functions are determined through the proportional allotment by the means functional quantity, as shown in FIG. 5. Provided that the functional quantities of the lower-level functions of "clearer characters", "cleaner background", and "thicker characters" are denoted by F1, F2 and F3, respectively, the functional quantity of the qualification-oriented function of "more beautiful characters" is obtained from the following equation (5):

$$F = \alpha_1 F1 + \alpha_2 F2 + \alpha_3 F3 \quad (5)$$

where $\alpha_1$, $\alpha_2$, and $\alpha_3$ are the weights of the aforesaid lower-level level functions. In the case shown in FIG. 5, the values of the weights are as follows:

$\alpha_1 = 0.639$ $\alpha_2 = 0.125$ $\alpha_3 = 0.236$

Figure 6A:
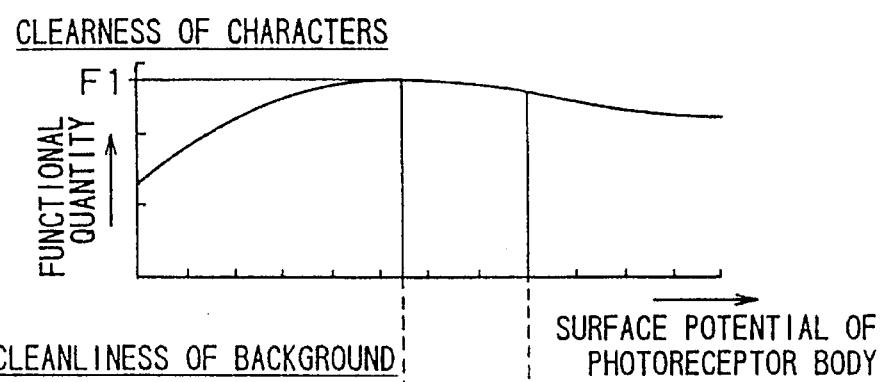
FIGS. 6A, 6B, and 6C are diagrams illustrating characteristic patterns of functional quantities of a qualification-oriented function.
Figure 6B:
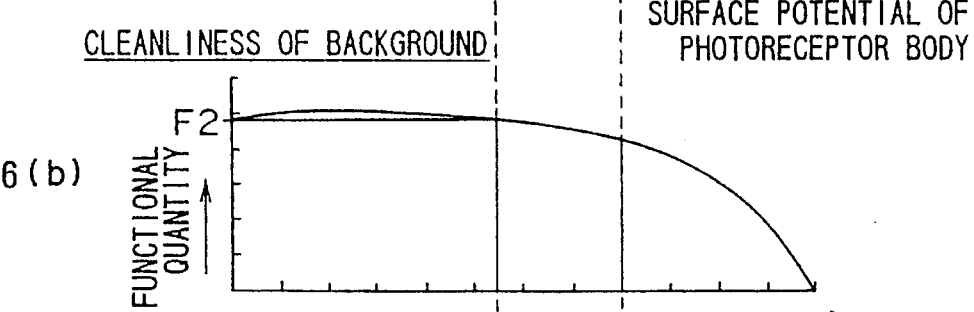
Figure 6C:
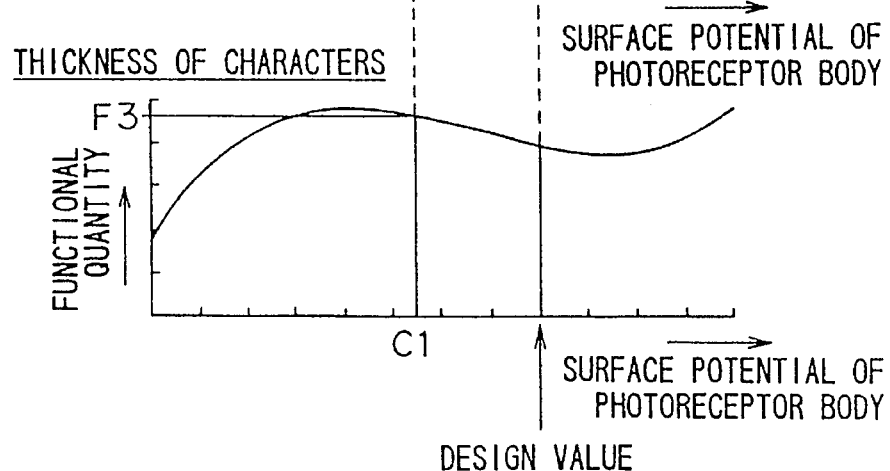

The value of the physical parameter (in this case, the surface potential of the photoreceptor body) is set to a value C1 which maximizes the functional quantity F of the qualification-oriented function "more beautiful characters" (see FIGS. 6A, 6B, and 6C).

Table 1 shows an evaluation result obtained by comparing two types of output images: (1) one is based on thus determined physical parameter value; and (2) the other is based on a physical parameter value which has been set in a conventional way by designers.

TABLE 1

| Evaluation of Output Images | |
|---|---|
| Number of people who support output image of type (1) | 17/25 |
| Number of people who support output image of type (2) | 8/25 |

As can be seen from this result, the output image based on the physical parameter value derived from the functional quantity is more supported and, therefore, the aforesaid Condition 3 is satisfied. This proves the feasibility of the functional evaluation by the functional quantity.

it is considered that the causes of a difference between the physical parameter value determined by the functional quantity and the design value set by the designers are as follows:

Cause 1

The parameter value set at the time of designing is based on a result of a tradeoff among the other qualification-oriented functions such as "better contrast" and "better gradation", and is therefore different from that based on the functional quantity obtained by limiting the objective function to the qualification-oriented function of "more beautiful characters"; and

Cause 2

It is difficult for the designers to take into account all combinations of parameter values to satisfy a plurality of qualification-oriented functions, because a query field is too large. Therefore, the designers could not find the setting value which was obtained by using the functional quantity in this experimental functional evaluation.

3. Examples of Self-Repairing Function According to the Present Invention

3-1. System Construction

Figure 7:
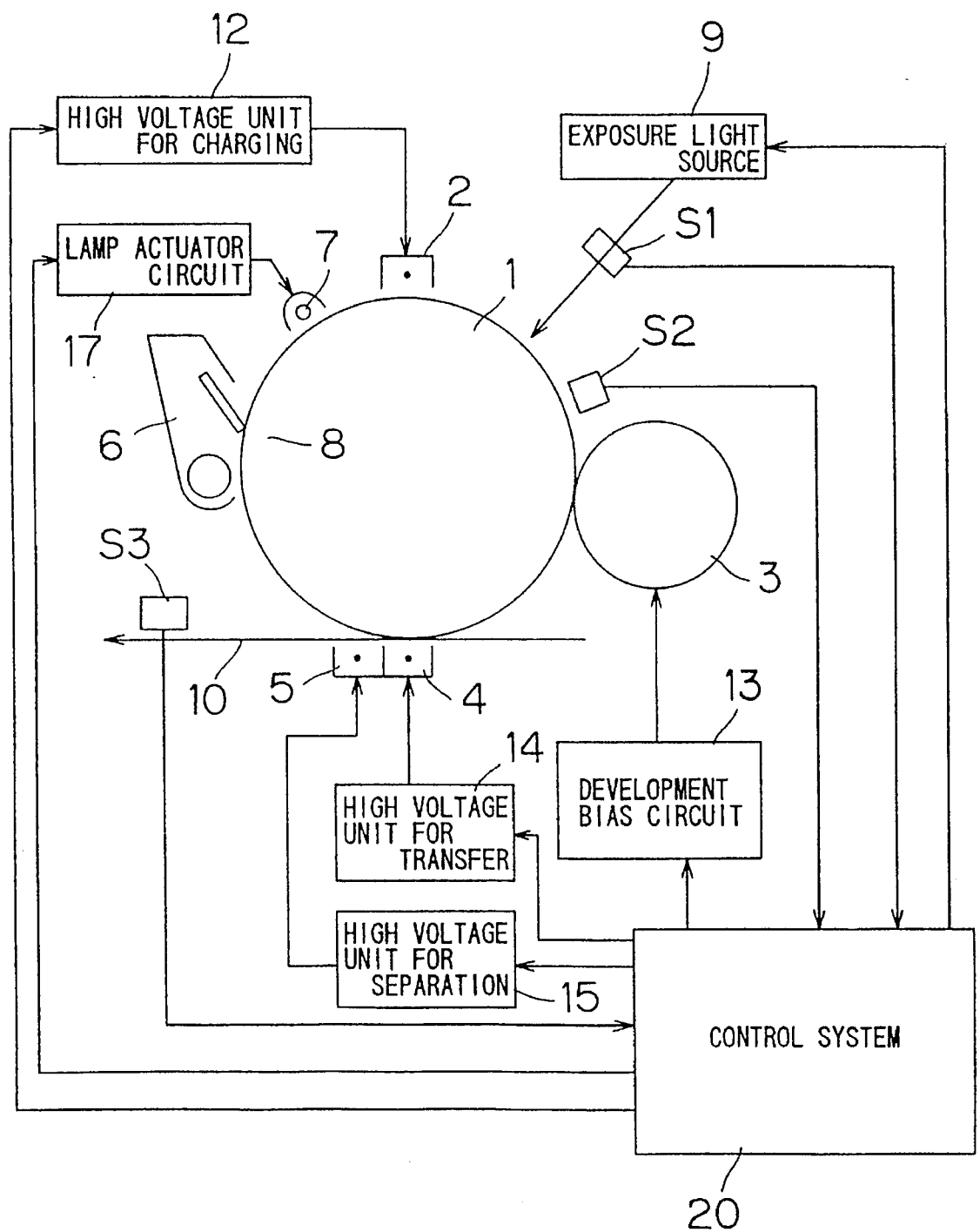
FIG. 7 is a conceptual diagram illustrating the main structure of an image forming apparatus according to one embodiment of the present invention.

FIG. 7 is a conceptual diagram illustrating the major construction of an image forming apparatus to which one embodiment of the present invention is applicable. Around a right-cylindrical photoreceptor body 1 are disposed a main charger 2, developing unit 3, transfer charger 4, separator charger 5, cleaning unit 6, and charge erase lamp 7 along a rotational direction 8 of the photoreceptor body 1. The surface of the photoreceptor body 1 uniformly charged through corona discharge by the main charger 2 is exposed to light from an exposure light source 9, thereby forming an electrostatic latent image corresponding to an image to be formed. The electrostatic latent image is developed into a toner image by means of the developing unit 3. The toner image is transferred onto a copy sheet 10 through corona discharge by the transfer charger 4. The copy sheet carrying the toner image on the surface thereof is separated from the photoreceptor body 1 through corona discharge by the separator charger 5. After the copy sheet is removed, residual toner on the surface of the photoreceptor body 1 is removed by the cleaning unit 6. The charge erase lamp 7 serves to remove residual electric charge by exposing the entire surface of the photoreceptor body 1 to light.

The exposure light source 9 may be comprised of an optical system of a type which illuminates and scans a document original, while guiding reflective light from the document original to the photoreceptor body 1, or a laser light source or a light-emitting diode array each of which is actuated in correspondence with an image to be formed.

From a high voltage unit 12 for charging, a high voltage is applied to the main charger 2. From a high voltage unit 14 for transfer and a high voltage unit 15 for separation, a high voltage is applied to the transfer charger 4 and separator charger 5, respectively. A high voltage is also applied to the developing unit 3 from a development bias circuit 13 for applying a development bias voltage between the photoreceptor body 1 and the developing unit 3. Power is supplied to the charge erase lamp 7 from a lamp actuator circuit 17. The high voltage units 12, 14 and 15, the development bias circuit 13, the lamp actuator circuit 17, and the exposure light source 9 are controlled by a control system 20. The control system 20 includes a micro-processor, and implements control operations based on output signals of a light quantity sensor S1, a surface potential sensor S2, and a toner image density sensor S3. The light quantity sensor S1 detects the quantity of light from the exposure light source 9. The surface potential sensor S2 detects the surface potential of the photoreceptor body 1 after light exposure. The toner image density sensor S3 detects the density of a toner image transferred onto a copy sheet 10.

Figure 8:
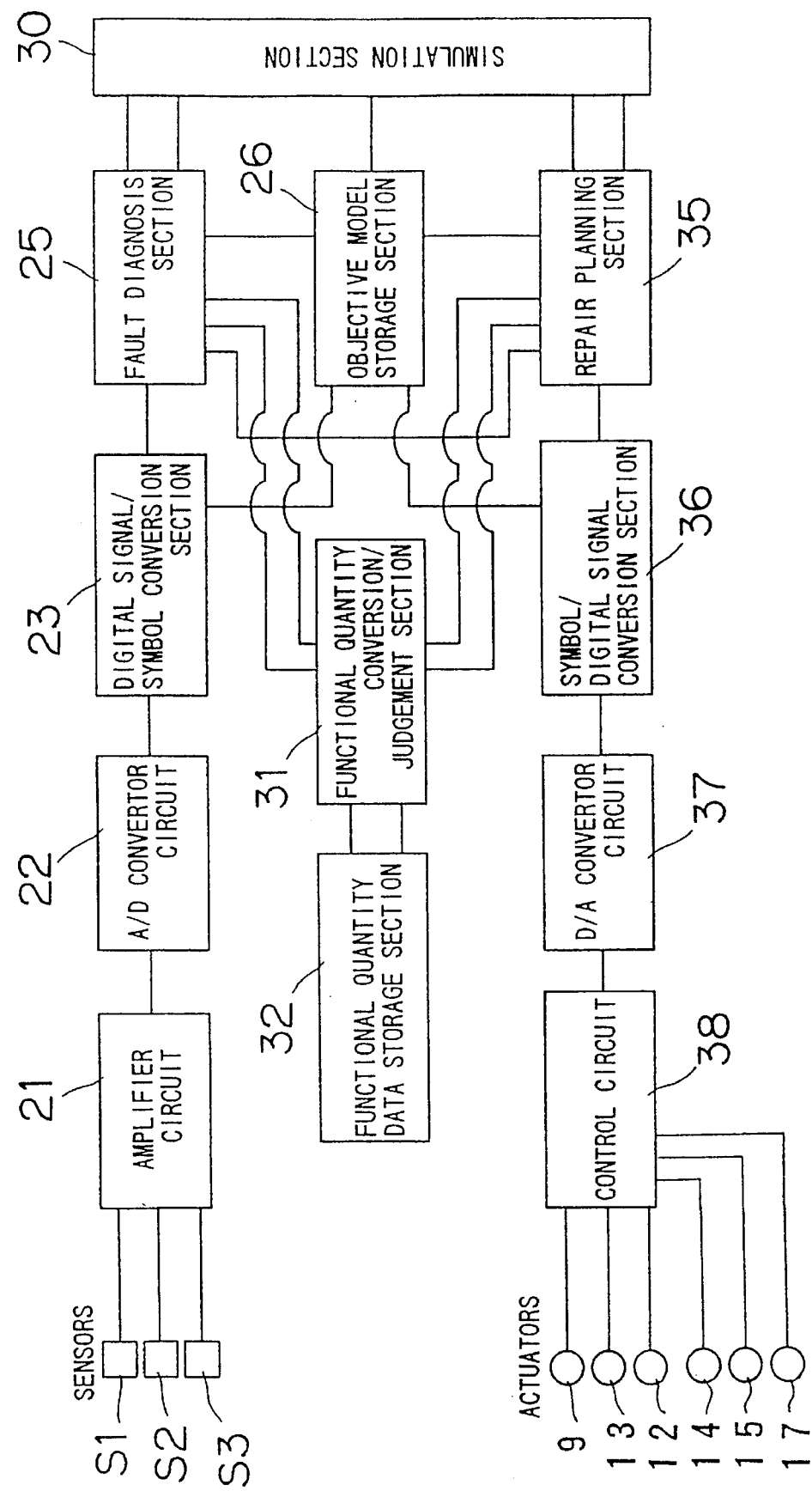
FIG. 8 is a block diagram illustrating the construction of a control system.

FIG. 8 is a block diagram illustrating the structure of the control system 20, in which processing functions implemented by the micro-processor are shown in respective function groups.

The control system 20 carries out a fault diagnosis, based on the outputs of the sensors S1, S2 and S3, and prepares a repair plan for repairing a diagnosed fault. At the time of preparing the repair plan, probable repair effects and candidate repairing methods are derived from a functional quantity, as will be described later. Based on the prepared repair plan, the control system 20 controls actuators, namely, the exposure light source 9, development bias circuit 13, high voltage units 12, 14 and 15, and/or lamp actuator circuit 17.

The output signals of the sensors S1, S2 and S3 are amplified by means of an amplifier circuit 21, then converted into digital signals by means of an A/D (analog/digital) converter circuit 22, and sent to a digital signal/symbol conversion section 23.

The digital signal/symbol conversion section 23 converts digital signals from the A/D convertor circuit 22 into qualitative data. That is, the digital signals from the A/D convertor circuit 22 are converted, for example, into any one of three symbols N, H and L indicative of "normal", "high" and "low", respectively. An approach to the fault diagnosis is facilitated by converting the digital signals from the sensors S1, S2 and S3 into the symbolized qualitative data.

When the digital signals are converted into a symbol in the digital signal/symbol conversion section 23, reference is made to objective models stored in an objective model storage section 26, namely, characteristic data intrinsic to the image forming apparatus of this embodiment. Specific examples of the characteristic data stored in the objective model storage section 26 are shown, for example, in the prior application filed by the applicant of the present invention, such as disclosed in Japanese Unexamined Patent Publication No. 4-130340 (1992) and, therefore, will not be described here.

The symbols utilized for the conversion in the digital signal/symbol conversion section 23 is not limited to the aforesaid three symbols N, H and L, but may employ other expressions such as "On" and "Off", and A, B, C and D. Alternatively, not only qualitative values but also fuzzy qualitative values may be employed for the conversion, as described in Japanese Unexamined Patent Publication No. 4-274455 (1992).

The output of the digital signal/symbol conversion section 23 is sent to a fault diagnosis section 25. By comparing the output symbol with the fault diagnosis knowledge preliminarily stored in the objective model storage section 26, the fault diagnosis section 25 judges whether there exists any fault or not, and makes a fault diagnosis. The fault diagnosis section 25 outputs the symbol to a simulation section 30. The simulation section 30 compares the output symbol with the characteristic data of the objective apparatus stored in the objective model storage section 26, simulates a fault state of the objective apparatus, expresses the fault state as a change in a parameter model, and then outputs the charge in a parameter model to the fault diagnosis section 25.

A repair planning section 35, when receiving a signal indicative of the presence of a fault from the fault diagnosis section 25, infers a repair plan for repairing the fault, and derives repairing operations to be carried out. The characteristic data stored in the objective model storage section 26 are utilized for the inference of the repair plan and the derivation of the repair operations.

The simulation section 30 also simulates a state of the apparatus which may occur when the repair plan is implemented. The simulation section 30, when simulating the state of the apparatus, refers to data stored in the objective model storage section 26 in substantially the same manner as the aforesaid simulation of the state of the fault. The simulation result obtained by the simulation section 30 is output to the repair planning section 35. The repair planning section 35 modifies the previously inferred repair plan and/or infers another repair plan.

According to the this embodiment, the apparatus also has a functional quantity conversion/judgement section 31 and functional quantity data storage section 32.

The functional quantity data storage section 32 stores a table which contains characteristic patterns of functional quantities for physical parameters concerning various functions. That is, characteristic patterns of the relationship between a functional quantity and a physical parameter for various functions as shown in FIGS. 6A, 6B, and 6C are preliminarily studied and stored in the functional quantity data storage section 32.

The functional quantity conversion/judgement section 31, when receiving a qualitative symbol data indicative of the fault state of the apparatus from the fault diagnosis section 25, judges the degree of the manifestation of each of the functions of the apparatus. That is, the functional quantity conversion/judgement section 31 refers to characteristic patterns of the functional quantities for the physical parameters stored in the functional quantity data storage section 32 and determines a functional quantity of each of the manifesting functions. The judgement result is output to the fault diagnosis section 25. With reference to this judgement result, the fault diagnosis section 25 realizes an accurate fault diagnosis.

When receiving the repair plan and proposed repair operations from the repair planning section 35, the functional quantity conversion/judgement section 31 calculates a functional quantity of each of the functions manifesting as a result of the repair operations, and then determines the most preferable repairing target by comparing the functional quantities of the functions. The most preferable repairing target is output to the repair planning section 35.

A symbol indicative of the repairing operation finally determined by the repair planning section 35 is output to a symbol/digital signal conversion section 36, in which the symbol is converted into digital signals with reference to the characteristic data stored in the objective model storage section 26.

The converted digital signals are converted into analog signals by means of a D/A (digital/analog) convertor circuit 37, and then output to a control circuit 38. The control circuit 38 controls the actuators including the exposure light source 9, development bias circuit 13, high voltage units 12, 14 and 15, and/or lamp actuator circuit 17, thereby self-repairing the fault which has been occurred.

In the foregoing, the comprehensive construction and control operations of the control system 20 has been outlined. Among the aforementioned control operations, every means of the fault diagnosis in the fault diagnosis section 25, the inference of the repair plan and the derivation of the repairing operations in the repair planning section 35, and the simulating a state of the apparatus in the simulation section 30 are detailed, for example, in the prior application filed by the applicant of the present invention, such as disclosed in Japanese Unexamined Patent Publication No. 4-130340 (1992).

Next, there will be described the content of data stored in the functional quantity data storage section 32 and the control operations implemented by the functional quantity conversion/judgement section 31 with reference to such data, both of which are the features of the present invention.

3-2. Finding a Compromise on Secondary Effects

When one function is degraded, an attempt is made to recover the function by operating an actuator relating to the function. This may produce secondary effects such as the degradation of another function. In a conventional apparatus having a self-repairing function, secondary effects accompanied with a repair operation are taken into consideration in a parameter model when a repair plan is inferred. However, the conventional apparatus having a self-repairing function makes such an extreme judgement as "if a secondary effect occurs as a result of a repairing operation, the repair operation is to be discontinued". On the contrary, the apparatus of this embodiment can flexibly handle a trade-off between functions by comparing the functions through the approximate quantification of the functions. For example, when there occurs such a situation as "though a function A to be repaired is recovered by a repair operation a, the degradation of a function B occurs as a secondary effect", the apparatus of this embodiment takes into account the balance of all the functions thereof to flexibly carry out the repair operation. That is, it is possible to make a judgement on the repair such as "whether the repair operation A should be done or not, and if it should be done, how far the operation should be carried out".

FIG. 9 shows a parameter model used for the judgement on secondary effects. This parameter model is used for the judgement on the secondary effects associated with the density of an output image and an image contrast, and is preliminarily stored in the objective model storage section 26. The reference characters shown in FIG. 9 denote parameters necessary for image forming. The parameters are influenced with each other along the stems of a tree-shape structure of the model. For example, a light quantity X of a halogen lamp is changed by an output HL of the halogen lamp and a density D of a document original. That is, if HL increases or D decreases, X increases. On the contrary, if HL decreases or D increases, X decreases.

Similarly, an output image density Os changes proportionally to the product of a toner density Ds on the photoreceptor drum and an output Vt of the transfer charger. Accordingly, when Os changes, the change may be attributed to a change in Ds or Vt.

Provided that such a fault symptom as "decreased density on solid portion" is output to the repair planning section 35 from the fault diagnosis section 25, the repair planning section 35 infers a repair operation in which an output Vn of the main charger 2 is increased. The result of this inference is sent to the simulation section 30, which simulates a state of the apparatus which may occur when the aforesaid repair operation is implemented. On the basis of the parameter model shown in FIG. 9, the simulation section 30 points out a secondary effect of "increased image contrast Ic", which is output to the repair planning section 35.

The repair planning section 35 outputs the inferred repair operation and the simulated secondary effect to the functional quantity conversion/judgement section 31. Upon receiving these outputs, the functional quantity conversion/judgement section 31 refers to the characteristic patterns of the functional quantities stored in the functional quantity data storage section 32, and carries out the following process.

The functional quantity conversion/judgement section 31 balances the two faulty functions, i.e., "decreased density on solid portion" and "increased image contrast". For the balancing of these two functions, the functional quantity conversion/judgement section 31 reads out characteristic patterns of functional quantities concerning two corresponding functions of "more beautiful solid portion" and "better contrast" stored in the functional quantity data storage section 32. These characteristic patterns are shown in FIGS. 10A and 10B. FIGS. 10A and 10B show the characteristic patterns of functional quantities concerning the functions of "more beautiful solid portion" and "better contrast", respectively. These functions are lower-level functions subordinating to a function of "more beautiful image".

Based on the characteristic patterns of the aforesaid two functional quantities, the functional quantity conversion/judgement section 31 calculates the output image density Os and image contrast Ic which ensure the maximum performance of the whole apparatus, and sets a value of a physical parameter Vn (indicative of the output of the main charger 2) for self-repair.

As shown in FIGS. 10A and 10B, for example, the output density Os and the image contrast Ic each take a value (1) when the function is normal, and take a value (2) when a fault (decreased density on solid portion) occurs. As can be seen from the parameter model shown in FIG. 9, the shifting direction of the output Vn of the main charger 2 for the repair operation is the same as that of the output image density Os and image contrast Ic and, therefore, the function concerning the contrast is degraded when the fault is repaired by controlling Vn. Accordingly, a tradeoff between the functions is required.

Functional quantities Fn, Ff, and Fr respectively defined for normal state, faulty state, and repaired state are calculated as follows:

*Normal state* $Fn=aF1+bF1'$

*Faulty state* $Ff=aF2+bF2'$

*Repair state* $Fr=aF3+bF3'$ where a and b are mean functional quantities of the functions of "more beautiful solid portion" and "good contrast", respectively, and are normalized so that $a+b-1$.

The relationship between these functional quantities is as follows:

$Fn \geq Fr > Ff$

Accordingly, the function quantity conversion/judgement section 31 specifies a value of the physical parameter (the output Vn of the main charger 2) so that Fr takes the maximum value, and the parameter value is output to the repair planning section 35. From the output parameter value, the repair planning section 35 derives a repair operation of increasing the output Vn of the main charger 2 for the repair of the fault of "decreased density on solid portion", and outputs the degree of the repair operation to be implemented, i.e., the output Vn of the main charger 2 to be increased. As a result, the repair can be implemented so as to maximize the function of "more beautiful image".

3-3. Quantification of Repairing Effects

When a function is degraded, the approach according to this embodiment, i.e., the approach by comparing functions with each other through approximate quantification, is very effective for the repair operation by controlling a parameter relative to the manifestation of a function as well as for a repair operation through functional redundancy as described above. The term "functional redundancy" means that, in substitution for a function of one component in an apparatus, potential functions of the other components existing in the apparatus are utilized. The repair operation through functional redundancy is described, for example, in prior applications filed by the applicant of the present invention, such as disclosed in Japanese Unexamined Patent Publication No. 5-165275 (1993).

In the repair operation through functional redundancy, a plurality of candidates of repairing methods may be derived. In such a case, a repairing effect on the whole apparatus is inferred for each of the repairing methods by comparing the degree of functional recovery and risk which may be brought about when each repairing method is employed. The degree of functional recovery means an increase in the functional quantity, and the risk means adverse effects which may be caused by the repairing method. The adverse effects include an increased power consumption, slower speed of image formation, and a shortened lifetime of the apparatus.

Therefore, if the risk is quantified by functional quantities, the effect and risk can be compared and the quantification of the repairing effect is realized through calculation. The most preferable repairing method can be selected from a plurality of candidate repairing methods, based on the quantified repairing effect employed as a criterion of the selection.

Taking an example of an apparatus having a self-repairing function of functional redundance type disclosed in Japanese Unexamined Patent Publication No. 5-165275 (1993), the quantification of a repairing effect will be hereinafter described. The construction of the apparatus is the same as that shown in FIG. 7. It is assumed that the following repairing methods are proposed for a fault of the filament breakage of a charger removal lamp:

Repairing Method 1

A halogen lamp (which is assumed to be included in an exposure light source 9) is alternatively used to recover the charge erase function; and Repairing Method 2

A separator charger 5 is alternatively used to recover the charge erase function.

Both of the aforesaid repairing methods can recover the charge erase function, and make out the image forming operation. However, these repairing methods have the following risks:

Risk of Repairing Method 1

Since the power consumption of the halogen lamp is high, the prolonged lighting time of the halogen lamp increases the power consumption of the whole apparatus; and Risk of Repairing Method 2

Since a photoreceptor body 1 has to rotate two times to form an image on one copy sheet, the speed of the image formation is reduced to half. Furthermore, the size of a copy sheet is limited (the length of the copy sheet is not greater than the circumference of the photoreceptor body 1 is not applicable).

In this case, it is reasonable to take into account both the risk and effect (charger removal effect) for the selection of a repairing method. By reading out and comparing functional quantity data relative to a function corresponding to the risk and a function corresponding to the effect which are preliminarily stored in a functional quantity data storage section 32, a repairing method which increases the comprehensive performance of the apparatus is selected.

FIGS. 11A and 11B show characteristic patterns of functional quantities of functions each corresponding to the risk and the effect for the repairing method of "the halogen lamp is alternatively used to recover the charge erase function". FIG. 11A shows a characteristic pattern of the functional quantity versus the residual charge for a function of "more beautiful image". FIG. 11B shows a characteristic pattern of the functional quantity versus the power consumption for a function of "lower copying cost". In FIGS. 11A and 11B (1), (2) and (3) denote values which are observed at a normal state, at a faulty state (filament breakage of charge removal lamp) and at a repaired state, respectively. The functional quantity $F_{repair}1$ at the repaired state is obtained from the following equation (6):

$$F_{repair}1=cF3+dF3' \qquad (6)$$

where c and d are mean functional quantities for the function of "more beautiful image" and the function of "lower copying cost", respectively, and are normalized so that c+d=1.

FIGS. 12A and 12B show characteristic patterns of functional quantities of functions each corresponding to the risk and effect for the repairing method of "separator charger is alternatively used to recover the charge erase function". FIG. 12A shows a characteristic pattern of the functional quantity versus the residual charge for a function of "more beautiful image". FIG. 12B shows a characteristic pattern of the functional quantity versus the copying speed for a function of "faster copying speed". FIG. 12C shows a characteristic pattern of the functional quantity versus the maximum size of copy sheet for a function of "desired copy size". In FIGS. 12A and 12B, (1), (2) and (3) denote values which are observed at a normal state, at a faulty state (filament breakage of charge removal lamp) and at a repaired state, respectively. The functional quantity $F_{repair}2$ at the repaired state is obtained from the following equation (7):

$$F_{repair}2=eF3+fF3''+gF3''' \qquad (7)$$

where e, f and g are mean functional quantities for the function of "more beautiful image", the function of "faster copying speed", and the function of "desired copy size", respectively, and are normalized so that e+f+g=1.

Thus obtained functional quantities $F_{repair}1$ and $F_{repair}2$ each corresponding to the aforesaid first and second repairing methods are compared with each other. A repairing method having a greater functional quantity is employed as a feasible repairing method to be implemented. Hence, the most preferable repairing method which maximizes the comprehensive performance of the apparatus is selected.

3-3. Timing of Implementing Repairing Operation

The timing of implementing a repairing operation is changed, depending on the kind and degree of a fault which has occurred. That is, the degree of comprehensive performance degradation of the apparatus is quantified by a functional quantity, based on the kind and degree of a fault. The timing of implementing a repairing operation is determined based on the functional quantity. For this purpose, characteristic patterns of functional quantities for functions relative to faults are previously stored in the functional quantity data storage section 32.

When such a fault symptom as "no image formed" occurs, for example, the apparatus may not function at all. In this case, a calculated functional quantity to be calculated is extremely small. Since it is desired to recover the function as soon as possible, diagnosis and repair operations are immediately carried out.

On the other hand, when such a fault symptom as "a little foggy background" occurs, it is not necessary to repair the fault immediately. That is, users are more adversely influenced by a repairing operation which interrupts the operation of the apparatus than by the performance degradation due to the fault. Therefore, the repairing operation for this fault is carried out when the copying machine is not in use (e.g., during nighttime). Thus, users' working efficiency is not reduced by the repairing operation. The judgement that the fault symptom is trivial is based on a fact that the functional quantity to relatively high.

4. Conclusion

According to this embodiment, there is introduced a concept of functional quantities indicative of quantified functional degrees of functions required for the image forming apparatus. Correct fault diagnosis and repair can be realized by utilizing the functional quantities.

More specifically, even if a certain repairing method employed for the recovery of a particular function adversely affects any other function, the repairing method can be appropriately applied through a trade-off between these functions.

If a plurality of repairing methods are proposed, the most preferably repairing method can be reliably employed because the efficiency of the repairing methods are judged based on functional quantities.

Furthermore, since the criticality of a fault can be quantified, the timing of implementing a fault repairing operation can be specified based on the criticality of the fault. Therefore, the repairing operation does not lower users' working efficiency.

Although the present invention has been described in the context of preferred embodiments, it should be understood that the same is not limited to the foregoing embodiments which take examples of image forming apparatus, and is applicable to various apparatus which can employ a self-repairing function.

It should also be understood that a variety of modifications can be made to the present invention without departing from the scope of the present invention as defined in the accompanying claims.

We claim:

1. An apparatus having a self-repairing function which implements a self-repair of a fault which prevents the apparatus from satisfactorily performing a given function, said apparatus comprising:

a functional quantity data storage means for decomposing said given function into a plurality of more specific lower-level functions, specifying for each of said plural lower-level functions a functional quantity indicative of a quantified functional degree of said each lower-level function, and storing preliminarily investigated characteristic data of the functional quantity indicative of a relationship between the functional quantity and a change in a physical parameter relative to the functional quantity;

a repair plan proposing means for suggesting a physical parameter which should be changed for the repair of the fault and a secondary effect which may be produced by a change in said physical parameter when the fault occurs;

a functional quantity calculation means for reading out of said functional quantity data storage means characteristic data of functional quantities of the lower-level functions corresponding to the suggested physical parameter and characteristic data of functional quantities of the lower-level function to be changed by the secondary effect, and calculating the most preferably balanced state of the read-out functional quantities of the lower-level functions for the repair of the fault; and a self-repair implementation means for determining a change value of the physical parameter suggested by said repair plan proposing means based on the calculated functional quantity, and altering the physical parameter by the determined change value to implement a self-repair of the apparatus.

2. An apparatus having a self-repairing function as set forth in claim 1, said apparatus further comprising a fault detection means for detecting a fault occurring.

3. An apparatus having a self-repairing function as set forth in claim 2, wherein said fault detection means comprises:

sensors disposed in predetermined locations in the apparatus for outputting a signal indicative of the state of the apparatus;

a qualitative value conversion means for converting an output of said sensors into a qualitative value corresponding to the output value;

an objective model storage means for storing characteristic data of the apparatus; and a fault diagnosis means for comparing the qualitative value given by said qualitative value conversion means with the characteristic data, and outputting the occurrence of a fault and the state of the fault based on the comparison result.

4. An apparatus having a self-repairing function as set forth in claim 1, wherein said apparatus is constructed as an image forming apparatus, and data stored in said functional quantity data storage means include characteristic data of functional quantities concerning a plurality of lower-level functions subordinating to a function of "more beautiful image".

5. An apparatus having a self repairing function as set forth in claim 3, wherein said apparatus is constructed as an image forming apparatus, and data stored in said functional quantity data storage means include characteristic patterns of functional quantities concerning a plurality of lower-level functions subordinating to a function of "more beautiful image".

6. An apparatus having a self-repairing function as set forth in claim 1, wherein data stored in said functional quantity data storage means include:

characteristic data of a functional quantity relative to an effect which is to be produced when an occurring fault is repaired; and characteristic data of a functional quantity relative to a risk which is to be caused when the occurring fault is repaired, and said functional quantity calculation means is adapted to balance the manifestation degrees of the functional quantities relative to the effect and the risk which are read out of the functional quantity data storage means so as to improve the comprehensive performance of the apparatus.

7. An apparatus having a self-repairing function as set forth in claim 3, wherein data stored in said functional quantity data storage means include:

characteristic data of a functional quantity relative to an effect which is to be produced when an occurring fault is repaired; and characteristic data of a functional quantity relative to a risk which is to be caused when the occurring fault is repaired, and said functional quantity calculation means is adapted to balance the manifestation degrees of the functional quantities relative to the effect and the risk which are read out of the functional quantity data storage means so as to improve the comprehensive performance of the apparatus.

8. An apparatus having a self-repairing function sa set forth in claim 6, wherein said repair plan proposing means is for specifying intrinsic components in the apparatus and proposing to utilize potential functions of specified components for a function of a faulty component to repair an occurring fault, and said functional quantity calculation means is for selecting a substitutive component having a low functional quantity relative to a risk caused by the fault repair when a plurality of substitutive components are proposed by said repair plan proposing means.

9. An apparatus having a self-repairing function as set forth in claim 6, wherein said repair plan proposing means is for specifying intrinsic components in the apparatus and proposing to utilize potential functions of the specified components for a function of a faulty component to repair an occurring fault, and said functional quantity calculation means is for selecting a substitutive component having a high functional quantity relative to an effect produced by the fault repair when a plurality of substitutive components are proposed by said repair plan proposing means.

10. An apparatus having a self-repairing function as set forth in claim 6, wherein said repair plan proposing means is for specifying intrinsic components in the apparatus and proposing to utilize potential functions of the specified components for a function of a faulty component to repair an occurring fault, and said functional quantity calculation means is for selecting substitutive components having well-balanced functional quantities relative to an effect and a risk by fault repair when a plurality of substitutive components are proposed by said repair plan proposing means.

11. An apparatus having a self-repairing function as set forth in claim 1, wherein data stored in said functional quantity data storage means include characteristic data assigned to a particular function important for the apparatus in which a functional quantity thereof is set to be extremely lowered by a change in a physical parameter relative to said particular function, and said functional quantity calculation means is adopted to output to said self-repair implementation means a signal indicating that a repair should be carried out immediately, when characteristic data of an extremely lowered functional quantity is included in characteristic data of a functional quantity read out of the functional quantity data storage means.

12. An apparatus having a self-repairing function as set forth in claim 3, wherein data stored in said functional quantity data storage means include characteristic data assigned to a particular function important for the apparatus in which a functional quantity thereof is set to be extremely lowered by a change in a physical parameter relative to said particular function, and said functional quantity calculation means is adopted to output to said self-repair implementation means a signal indicating that a repair should be carried out immediately, when characteristic data of an extremely lowered functional quantity is included in characteristic data of a functional quantity read out of the functional quantity data storage means.

13. A method of self-repairing a fault which prevents an objective apparatus from satisfactorily performing a given function, comprising steps of:

decomposing said given function into a plurality of more specific lower-level functions, setting for each of said plural lower-level functions a functional quantity indicative of a quantified functional degree of said each lower-level function, and preliminarily investigating and preparing characteristic data of the functional quantity indicating a relationship between the functional quantity and a change in a physical parameter corresponding to the functional quantity;

detecting a physical parameter which should be changed for the repair of the fault and a secondary effect which may be produced by a change in said physical parameter when the fault occurs;

selecting characteristic data of functional quantities of the lower-level functions corresponding to the detected physical parameter and characteristic data of functional quantities of the lower-level function to be changed by the secondary effect from said previously prepared characteristic data;

calculating the most preferably balanced state of the selected each of functional quantities of the lower-level functions; and implementing a self-repair by changing a value of said detected physical parameter to realize the calculated most preferably balanced state of the selected functional quantities.

14. A method of self-repairing a fault in an apparatus as set forth in claim 13, wherein said objective apparatus includes an image forming apparatus, and functional quantity data previously prepared include characteristic data of functional quantities concerning a plurality of lower level functions subordinating to a function of "more beautiful image".

15. A method of self-repairing a fault in an apparatus as set forth in claim 13, wherein said prepared functional quantity data include:

characteristic data of a functional quantity relative to an effect which is to be produced when an occurring fault is repaired; and characteristic data of a functional quantity relative to a risk which is to be caused when the occurring fault is repaired, and the manifestation degrees of the functional quantities relative to the effect and the risk are balanced in said calculation step so as to improve the comprehensive performance of the apparatus.

16. An apparatus having a self-repairing function which implements a self-repair of a fault which prevents the apparatus from satisfactorily performing a given function, said apparatus comprising:

a functional quantity data storage means storing preliminarily investigated characteristic data of a functional quantity relative to an effect which is to be produced when an occurring fault is repaired and preliminarily investigated characteristic data of a functional quantity relative to a risk which is to be caused when the occurring fault is repaired;

a repair plan proposing means for proposing a plurality of repair plans when a fault occurs;

means for reading out of said functional quantity data storage means characteristic data of a functional quantity relative to an effect and characteristic data of a functional quantity relative to a risk for each of said plural repair plans proposed by said repair plan proposing means, corresponding to repair plans proposed by said repair plan proposing means;

means for balancing the read-out characteristic data of functional quantities relative to the effect and the risk, and calculating to specify the most suitable repair plan which improves the comprehensive performance of the apparatus; and means for self-repairing the apparatus in accordance with the repair plan specified through calculation.

* * * * *